United States Patent Office 3,385,675
Patented May 28, 1968

3,385,675
DISSOLVING SALT CONTAINING CALCIUM SULFATE IN THE PRESENCE OF AN AMINOPHOSPHONIC ACID
Howard W. Fiedelman, Woodstock, Ill., assignor to Morton International, Inc., Chicago, Ill., a corporation of Delaware
No Drawing. Filed Oct. 11, 1965, Ser. No. 494,876
6 Claims. (Cl. 23—312)

ABSTRACT OF THE DISCLOSURE

Process for producing a brine or salt having a reduced calcium sulfate content, which comprises contacting a crude salt containing calcium sulfate as an impurity with a water solution of an organic phosphono compound in an alkaline material, and thereafter maintaining said solution in contact with a crude salt for a period of time sufficient to dissolve the salt and form a substantially saturated brine characterized by a reduced calcium sulfate content.

This invention relates to novel compositions comprising organic phosphono compounds in combination with alkaline compounds and to the use of such compositions in a method for preparing sodium chloride brine having a reduced calcium sulfate content from crude sodium chloride containing calcium sulfate as a contaminant. The term "brine" which is used throughout this specification refers to an aqueous solution of sodium chloride.

As a chemical raw material which is used to produce other chemicals, sodium chloride, or more commonly salt, is an industrially essential and basic raw material. Many chemical industries are totally dependent upon a supply of pure sodium chloride. In certain chemical processes, the presence of impurities in salt, as for example calcium compounds, is detrimental to successful operation and to the efficient production of a desired product. In the preparation of chlorine and caustic by the electrolysis of concentrated salt brine, it is a prerequisite to successful operation that the brine employed be entirely free of impurities or that they be present in only minor trace concentrations. The presence of calcium sulfate causes deterioration of electrodes and deposition on the cell diaphragm. Virtually the same defects are observed by calcium sulfate contamination in the electrolysis of molten sodium chloride to produce metallic sodium and chlorine.

In food processing, the effect of calcium on some foodstuffs which are processed by means of salt is also well known. For example, in the case of leguminous vegetables such as peas and beans, calcium in salt reacts with the pectin present in the vegetable skin, forming calcium pectinate. This results in a toughening of the skin so that a salt low in calcium is required for processing these vegetables. Salt containing conventional amounts of calcium sulfate tends to cause grittiness when added to butter. A low calcium content in pickling brine is necessary to prevent precipitation of calcium phosphate in those pickling brines to which phosphates are added in the treatment of ham.

Crude sodium chloride in the form of rock salt contains calcium sulfate as a natural contaminant in amounts ranging up to about 3 percent. Rock salt may be mined in the conventional manner and the resultant solid salt processed to remove objectional impurities by dissolution in water to form a brine, followed by subsequent treatment with chemical reagents to precipitate the unwanted substances which are discarded. Evaporation of the purified brine yields purified salt. Rock salt may also be mined by a so-called brine well procedure, also known as solution mining in which water is pumped into a pipe leading into a rock salt deposit and saturated brine containing the usual impurities is recovered. Brine obtained by this method must of course also be treated to remove impurities. In general, it is more costly and cumbersome to remove sulfate from a brine containing calcium sulfate as an impurity than to remove calcium. As is readily understood, these purification techniques involve a plurality of process steps, the use of complicated processing equipment, engineering supervision and considerable labor.

Accordingly, it would be desirable to provide novel compositions for use in a brining operation and a method for preparing saturated brine having a reduced calcium sulfate content from crude salt without resorting to expensive, laborious and cumbersome dissolution, precipitation and brine evaporation methods.

Although improvements in processes for the provision of salt or brine having a reduced calcium content have been effected in the past by the pre-addition of various additives to either the crude salt or to the dissolving water, or both, it would be desirable to provide additional novel additives to further advance the technology of the production of purified salt or brine which additives obviate the necessity for employing extensive chemical purification treatments.

It is therefore an object of the present invention to provide novel compositions which are useful as additives in the preparation of brine having a reduced calcium sulfate content.

Another object of the present invention is to provide a simplified process for the preparation of brine having a reduced calcium sulfate content from crude sodium chloride containing a substantial quantity of calcium sulfate.

A further object of the present invention is to provide a simplified process for the preparation of brine having a reduced calcium sulfate content from crude sodium chloride containing a substantial quantity of calcium sulfate which process substantially reduces the quantity of chemicals required to effect the subsequent essentially complete removal of calcium compounds by conventional treatment methods.

A still further object of the present invention is to provide a simplified process for the preparation of brine having a reduced calcium sulfate content from crude sodium chloride containing a substantial quantity of calcium sulfate, which process utilizes novel additives which inhibit the dissolution of calcium sulfate in a brining process.

The fulfillment of these and other objects of this invention may be more readily appreciated by reference to the following specification, examples and appended claims.

Accordingly, in one broad form the present invention is a composition which comprises:

(a) An organic phosphono compound selected from the group consisting of amino tri (methylphosphonic) acid, amino monoacetic di (methylphosphonic) acid, amino diacetic (monomethylphosphonic) acid and the sodium and potassium salts thereof, and (b) An alkaline compound selected from the group consisting of hydoxides and carbonates of sodium and potassium.

The present invention also includes an improved process for the preparation of a brine having a reduced calcium sulfate content which comprises premixing with either:

(1) Crude salt containing calcium sulfate as an impurity
(2) With water used to dissolve said salt, or
(3) With both water and said crude salt
   (a) An organic phosphono compound selected from the group consisting of amino tri (methylphosphonic) acid, amino monoacetic di (methylphosphonic) acid, amino diacetic (monomethylphosphonic) acid, and the sodium and potassium salts thereof, and (b) An alkaline compound selected from the group consisting of the hydroxide and carbonates of sodium or potassium, and thereafter maintaining said water in contact with said crude salt for a period of time sufficient to dissolve the salt and form a substantially saturated brine.

The structural representation of the organic phosphono compounds useful in the present invention is as follows:

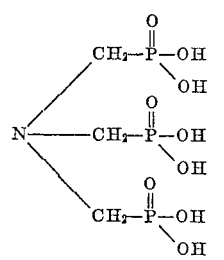

Amino tri (methyl phosphonic) acid

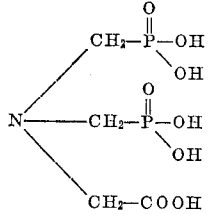

Amino monoacetic di (methyl-phosphonic) acid

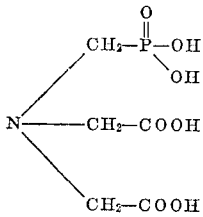

Amino diacetic (monomethyl-phosphonic) acid

The sodium and potassium salts of amino tri (methylphosphonic) acid may be formed by the substitution of sodium or potassium for all or less than all of the hydrogen atoms of the hydroxyl groups.

It is understood that ordinary tap water containing some hardness in the bicarbonate form is used as the dissolving water in the process of the present invention. If water containing no bicarbonate ion is used, then in the instance where sodium hydroxide is the alkaline compound, it is necessary to add bicarbonate ion to the water.

It has been found that the use of the particular combination of above described compounds in the production of saturated brine provides a synergistic or enhanced reduction in the dissolution of calcium sulfate over that achieved by the separate use of the individual compounds. That is, the effect in inhibiting the dissolution of calcium sulfate during a brining operation by the aforesaid combination is greater than that which can be accounted for by the additive contributions of the individual components.

Although a water soluble alkaline compound selected from the group consisting of the hydroxides and carbonates of sodium and potassium itself has an initial effect in inhibiting or reducing the solubilization of calcium sulfate during a brining process, each of these compounds is soon consumed after a relatively short period of contact time by reaction with the dissolved calcium sulfate. Thus, these compounds, when used alone, are ineffective for a sustained brining operation. However, a combination of an alkaline compound and an organic phosphono compound as hereinbefore described functions to inhibit or suppress the solubilization of calcium sulfate in a brining process with the added advantage that the alkaline compound is not continuously depleted as is the case with the use of one of said alkaline compounds alone. The effect of a combination of one of the hereinabove described organic phosphono compounds with an alkaline compound selected from the group consisting of sodium hydroxide, sodium carbonate, potassium hydroxide and potassium carbonate is to retain in the brine solution the alkaline compound with the result that the dissolution of calcium sulfate is inhibited.

Further, the reduction in calcium sulfate content is entirely out of proportion to the small quantities of additives employed, i.e., the phenomenon displayed does not depend upon a stoichiometric relationship between the amount of calcium sulfate present and the concentration of additives required.

In the practice of the present invention, sodium hydroxide and potassium hydroxide may be used interchangeably as they are equivalent in their effect. The same is true of sodium carbonate and potassium carbonate. Broadly, on a water basis, the alkali metal hydroxides and carbonates are employed in a concentration up to about 6000 parts per million in combination with up to about 500 parts per million of organic phosphono compound. The use of as little as 25 parts per million of the aftermentioned alkaline compounds in combination with as little as one part per million of organic phosphono compound is effective in the preparation of a brine having a reduced calcium content. As previously stated, the process may be carried out by adding the combination of alkaline compounds and organic phosphono compound to either the dissolving water, or to the crude salt or to both water and salt prior to admixture of water and salt to form the brine.

In one preferred form of the proces of this invention, from about 5 to about 500 parts per million of the organic phosphono compound in combination with from about 50 to about 500 parts per million of the alkaline compound (concentration is on a water basis) are employed. A most preferred concentration of organic phosphono compound is from about 5 to 50 p.p.m. The solid composition of this invention preferably contain from 0.05 to 2000 parts per million of alkaline material per part of organic phosphono compound.

In order to evaluate the effect of the organic phosphono compounds of the present invention in combination with up to about 2000 parts per million of an alkaline compound in inhibiting or suppressing the dissolution of calcium sulfate in a brining process, the following test procedure was employed:

TEST PROCEDURE

Five hundred grams of crushed, crude salt containing up to about 3 percent by weight of calcium sulfate as an impurity are added to 200 milliliters of water contained in a pint jar provided with a cap. The jar is tightly capped and the mixture is turned end over end ten times and allowed to stand for a period of 168 hours. At the end of this storage period, a sample is withdrawn and analyzed for calcium content according to a standard method of analysis. The test is repeated with the various additives of the present invention and the results obtained are compared with that of a control.

For a more complete understanding of the present invention, reference is made to the following specific examples. The concentration of the various additives employed are on a water basis.

Example 1

Compositions ranging from one to 50 parts per million of the sodium salt of amino tri (methylphosphonic) acid in combination with from 25 to 400 parts per million of sodium hydroxide respectively were carried through the above Test Procedure. The calcium content of the resulting brine was determined in each instance at the end of the storage period of 168 hours. In addition, the sodium salt of amino tri (methylphosphonic) acid alone and sodium hydroxide alone, in the concentrations in which they were used in combination with each other, were carried through the same test procedure and the calcium content of the resultant brine was determined to provide a standard against which the performance of the combinations of these substances in reducing the dissolution of calcium sulfate could be compared.

Table I sets forth the results obtained.

combination with from 100 to 1000 parts per million of sodium carbonate respectively were carried through the Test Procedure. The calcium content of the resultant brine was determined in each instance at the end of the storage period. In addition, the sodium salt of amino tri (methylphosphonic) acid alone and sodium hydroxide alone, in the concentrations in which they were used in combination with each other, were carried through the same procedure and the calcium content of the resultant brine was determined to provide a standard against which the calcium-inhibiting effect of the combinations could be compared.

TABLE I

| Concentration, p.p.m. | | | Calcium expressed as Calcium Sulfate in grams per liter | | | Syn.[2] | Percent Syn.[3] |
|---|---|---|---|---|---|---|---|
| Sodium Salt of amino tri (methylphosphonic) acid | Sodium Hydroxide | Total | Actual | Actual Decrease | Theoretical Decrease[1] | | |
| 0 | 0 | 0 | [4]3.19 | | | | |
| 1 | 0 | 1 | 2.93 | 0.20 | | | |
| 5 | 0 | 5 | 3.03 | 0.10 | | | |
| 10 | 0 | 10 | 3.03 | 0.10 | | | |
| 25 | 0 | 25 | 2.73 | 0.40 | | | |
| 50 | 0 | 50 | 2.72 | 0.41 | | | |
| 0 | 25 | 25 | 2.46 | 0.67 | | | |
| 0 | 50 | 50 | 2.18 | 0.95 | | | |
| 0 | 100 | 100 | 2.14 | 0.99 | | | |
| 0 | 200 | 200 | 2.94 | 0.19 | | | |
| 0 | 400 | 400 | 3.45 | +0.32 | | | |
| 1 | 25 | 26 | 2.24 | 0.89 | 0.87 | 0.02 | 2 |
| 5 | 50 | 55 | 1.26 | 1.87 | 1.05 | 0.82 | 78 |
| 5 | 100 | 105 | 1.05 | 2.08 | 1.09 | 0.99 | 91 |
| 10 | 50 | 60 | 1.32 | 1.81 | 1.05 | 0.76 | 72 |
| 10 | 100 | 110 | 1.06 | 2.07 | 1.09 | 0.98 | 89 |
| 25 | 50 | 75 | 1.08 | 2.05 | 1.35 | 0.70 | 52 |
| 25 | 100 | 125 | 0.85 | 2.28 | 1.39 | 0.89 | 64 |
| 50 | 400 | 450 | 0.71 | 2.42 | 0.09 | 2.33 | 2,580 |

[1] Theoretical Decrease: The figures in this column represent the sums of the actual decreases of each individual component.
[2] Syn. (Synergism): The figures in this column are a measure of synergism and represent the decrease in the number of grams of calcium sulfate per liter of brine obtained by the use of the above combinations as compared to the use of the individual components.
[3] Percent Synergism: These figures are computed by dividing the decrease in the number of grams of calcium sulfate (synergism) by the theoretical decrease and multiplying by 100.
[4] Control or theoretical number of grams.

Comparing the actual number of grams of calcium sulfate per liter in the resultant brine with the theoretical number of grams of calcium sulfate per liter, it is seen that in every instance the combination of the sodium salt of amino tri (methylphosphonic) acid with sodium hydroxide provides a brine in which the calcium sulfate content is reduced to a level which is significantly less than which can be accounted for by the additive contributions of the individual components.

Example 2

Compositions ranging from 5 to 50 parts per million of the sodium salt of amino tri (methylphosphonic) acid in Table II sets forth the results obtained.

TABLE II

| Concentration, p.p.m. | | | Calcium expressed as Calcium Sulfate in grams per liter | | | Syn. | Percent Syn. |
|---|---|---|---|---|---|---|---|
| Sodium Salt of amino tri (methylphosphonic) acid | Sodium Carbonate | Total | Actual | Actual Decrease | Theoretical Decrease | | |
| 0 | 0 | 0 | 3.17 | | | | |
| 5 | 0 | 5 | 3.03 | 0.14 | | | |
| 10 | 0 | 10 | 3.03 | 0.14 | | | |
| 25 | 0 | 25 | 2.73 | 0.44 | | | |
| 50 | 0 | 50 | 2.72 | 0.45 | | | |
| 0 | 100 | 100 | 2.84 | 0.33 | | | |
| 0 | 200 | 200 | 2.93 | 0.24 | | | |
| 0 | 500 | 500 | 2.79 | 0.38 | | | |
| 0 | 1,000 | 1,000 | 2.37 | 0.80 | | | |
| 5 | 100 | 105 | 2.19 | 0.98 | 0.47 | 0.51 | 108 |
| 5 | 200 | 205 | 1.76 | 1.41 | 0.38 | 1.03 | 272 |
| 5 | 500 | 505 | 1.08 | 2.09 | 0.52 | 1.57 | 302 |
| 10 | 100 | 110 | 1.93 | 1.24 | 0.47 | 1.77 | 164 |
| 10 | 200 | 210 | 1.43 | 1.74 | 0.38 | 1.36 | 357 |
| 10 | 500 | 510 | 1.05 | 2.12 | 0.52 | 1.60 | 308 |
| 25 | 100 | 125 | 1.73 | 1.44 | 0.77 | 0.67 | 87 |
| 25 | 200 | 225 | 1.26 | 1.91 | 0.68 | 1.23 | 181 |
| 25 | 500 | 525 | 0.79 | 2.38 | 0.82 | 1.56 | 190 |
| 50 | 1,000 | 1,050 | 0.54 | 2.63 | 1.25 | 1.38 | 110 |

These results illustrate the synergistic effect in reducing the dissolution of calcium sulfate obtained by the indicated combinations of the sodium salt of amino tri (methylphosphonic) acid and sodium carbonate.

Example 3

Compositions containing 25 parts per million of amino tri (methylphosphonic) acid in combination with 50 to 100 parts per million of sodium hydroxide respectively were carried through the Test Procedure. The calcium sulfate content of the resultant brine was determined as before.

Table III sets forth the results obtained.

TABLE III

| Concentration, p.p.m. | | | Calcium expressed as Calcium Sulfate in grams per liter | | | Syn. | Percent Syn. |
|---|---|---|---|---|---|---|---|
| Amino tri (methylphosphonic) acid | Sodium Hydroxide | Total | Actual | Actual Decrease | Theoretical Decrease | | |
| 0 | 0 | 0 | 3.14 | | | | |
| 25 | 0 | 25 | 2.69 | 0.45 | | | |
| 0 | 50 | 50 | 2.18 | 0.96 | | | |
| 0 | 100 | 100 | 2.14 | 1.00 | | | |
| 25 | 50 | 75 | 1.27 | 1.87 | 1.41 | 0.46 | 32 |
| 25 | 100 | 125 | 0.86 | 2.28 | 1.45 | 0.83 | 57 |

These results demonstrate the synergistic effect of a combination of amino tri (methylphosphonic) acid and sodium hydroxide in reducing the dissolution of calcium sulfate in a brining process.

Example 4

Compositions ranging from 25 to 500 parts per million of amino diacetic (monomethylphosphonic) acid in combination with from 100 to 400 parts per million of sodium hydroxide respectively were carried through the Test Procedure. The calcium sulfate content of the resultant brine was determined as before.

Table IV sets forth the results obtained.

MODIFIED TEST PROCEDURE

In order to evaluate the effect of the sodium salt of amino tri (methylphosphonic) acid in combination with up to about 6000 parts per million of an alkaline compound in inhibiting or suppressing the dissolution of calcium sulfate in a brining process, the hereinbefore described Test Procedure was employed with the exception that analyses were made for sulfate content rather than calcium content. This modification was necessitated by the fact that at concentrations of alkaline compound approaching 6000 parts per million, which is virtually a stoichiometric relationship between the quantity of alka-

TABLE IV

| Concentration, p.p.m. | | | Calcium expressed as Calcium Sulfate in grams per liter | | | Syn. | Percent Syn. |
|---|---|---|---|---|---|---|---|
| Amino diacetic (monomethylphosphonic) acid | Sodium Hydroxide | Total | Actual | Actual Decrease | Theoretical Decrease | | |
| 0 | 0 | 0 | 3.29 | | | | |
| 25 | 0 | 25 | 2.58 | 0.71 | | | |
| 100 | 0 | 100 | 2.51 | 0.78 | | | |
| 500 | 0 | 500 | 3.20 | 0.09 | | | |
| 0 | 100 | 100 | 2.14 | 1.15 | | | |
| 0 | 200 | 200 | 2.94 | 0.35 | | | |
| 0 | 400 | 400 | 3.45 | +0.16 | | | |
| 25 | 100 | 125 | 1.33 | 1.96 | 1.86 | 0.10 | 5 |
| 100 | 200 | 300 | 1.02 | 2.27 | 1.13 | 1.14 | 100 |
| 100 | 400 | 500 | 1.10 | 2.19 | 0.94 | 1.25 | 133 |
| 500 | 200 | 700 | 2.20 | 1.09 | 0.44 | 0.65 | 147 |
| 500 | 400 | 900 | 1.02 | 2.27 | +0.07 | 2.34 | 3,340 |

These results illustrate the synergistic effect in reducing the dissolution of calcium sulfate obtained by combinations of amino diacetic (monomethylphosphonic) acid and sodium hydroxide.

Example 5

Compositions ranging from 25 to 500 parts per million of amino diacetic (monomethylphosphonic) acid in combination with 100 to 1000 parts per million of sodium carbonate respectively were carried through the Test Procedure. The calcium sulfate content of the resultant brine was determined as before.

Table V sets forth the results obtained.

line compound and the calcium content of the impure salt, calcium ion is effectively removed from solution. However, since undesirable sulfate ion remains and must be prevented from dissolving and contaminating the resultant brine, a measure of the quantity of sulfate dissolved in brine treated according to the present invention is indicative of the effectiveness of the above additive combinations. Example 6 is illustrative:

Example 6

Compositions containing 100 and 500 parts per million respectively of the sodium salt of amino tri (methylphosphonic) acid in combination with from 2000 to 6000

TABLE V

| Concentration, p.p.m. | | | Calcium expressed as Calcium Sulfate in grams per liter | | | Syn. | Percent Syn. |
|---|---|---|---|---|---|---|---|
| Amino diacetic (monomethylphosphonic) acid | Sodium Carbonate | Total | Actual | Actual Decrease | Theoretical Decrease | | |
| 0 | 0 | 0 | 2.92 | | | | |
| 25 | 0 | 25 | 2.58 | 0.34 | | | |
| 100 | 0 | 100 | 2.51 | 0.41 | | | |
| 500 | 0 | 500 | 3.20 | +0.28 | | | |
| 0 | 100 | 100 | 2.84 | 0.08 | | | |
| 0 | 200 | 200 | 2.93 | +0.01 | | | |
| 0 | 500 | 500 | 2.79 | 0.13 | | | |
| 0 | 1,000 | 1,000 | 2.37 | 0.55 | | | |
| 25 | 100 | 125 | 2.09 | 0.83 | 0.42 | 0.41 | 98 |
| 100 | 100 | 200 | 2.26 | 0.66 | 0.49 | 0.17 | 35 |
| 100 | 200 | 300 | 1.95 | 0.97 | 0.40 | 0.57 | 142 |
| 100 | 500 | 600 | 1.25 | 1.67 | 0.54 | 1.13 | 210 |
| 500 | 1,000 | 1,500 | 1.40 | 1.52 | 0.27 | 1.25 | 460 | parts per million of sodium carbonate respectively were carried through the above Modified Test Procedure.

Table VI sets forth the results obtained.

TABLE VI

| Concentration, p.p.m. | | | Sulfate expressed as Calcium sulfate in grams per liter | | | Syn. | Percent Syn. |
| --- | --- | --- | --- | --- | --- | --- | --- |
| Sodium salt of amino tri(methylphosphonic) acid | Sodium Carbonate | Total | Actual | Actual Decease | Theoretical Decrease | | |
| 0 | 0 | 0 | 3.13 | | | | |
| 100 | 0 | 100 | 2.30 | 0.83 | | | |
| 500 | 0 | 500 | 1.57 | 1.56 | | | |
| 0 | 2,000 | 2,000 | 4.08 | +0.95 | | | |
| 0 | 4,000 | 4,000 | 4.75 | +1.62 | | | |
| 0 | 6,000 | 6,000 | 5.05 | +1.92 | | | |
| 100 | 2,000 | 2,100 | 0.83 | 2.30 | +0.12 | 2.42 | 2,000 |
| 500 | 2,000 | 2,500 | 0.33 | 2.80 | 0.61 | 2.19 | 360 |
| 100 | 4,000 | 4,100 | 1.20 | 1.93 | +0.79 | 2.72 | 344 |
| 500 | 4,000 | 4,500 | 0.38 | 2.76 | +0.06 | 2.81 | 4,670 |
| 100 | 6,000 | 6,100 | 1.25 | 1.88 | +1.09 | 2.97 | 272 |
| 500 | 6,000 | 6,500 | 0.58 | 2.55 | +0.36 | 2.91 | 810 |

These results clearly demonstrate the synergistic effect in suppressing the dissolution of calcium sulfate obtained by the indicated combinations of the sodium salt of amino tri (methylphosphonic) acid and sodium carbonate, not only by the suppression of calcium dissolution as hereinbefore described, but also by the suppression of sulfate dissolution.

Example 7

Compositions containing 100 and 500 parts per million respectively of the sodium salt of amino tri (methylphosphonic) acid in combination with from 500 to 2000 parts per million of sodium hydroxide respectively were carried through the above Modified Test Procedure.

Table VII sets forth the results obtained.

TABLE VII

| Concentration, p.p.m. | | | Sulfate expressed as Calcium sulfate in grams per liter | | | Syn. | Percent Syn. |
| --- | --- | --- | --- | --- | --- | --- | --- |
| Sodium salt of amino tri (methylphosphonic) acid | Sodium Hydroxide | Total | Actual | Actual Decease | Theoretical Decrease | | |
| 0 | 0 | 0 | 3.13 | | | | |
| 100 | 0 | 100 | 2.30 | 0.83 | | | |
| 500 | 0 | 500 | 1.57 | 1.56 | | | |
| 0 | 500 | 500 | 3.48 | +0.35 | | | |
| 0 | 1,000 | 1,000 | 3.65 | +0.52 | | | |
| 0 | 2,000 | 2,000 | 3.55 | +0.42 | | | |
| 100 | 500 | 600 | 0.70 | 2.43 | 0.48 | 1.95 | 405 |
| 500 | 500 | 1,000 | 0.63 | 2.50 | 1.21 | 1.29 | 107 |
| 100 | 1,000 | 1,100 | 0.65 | 2.48 | 0.31 | 2.17 | 700 |
| 500 | 1,000 | 1,500 | 0.64 | 2.49 | 1.04 | 1.45 | 139 |
| 100 | 2,000 | 2,100 | 0.60 | 2.53 | 0.41 | 2.12 | 515 |
| 500 | 2,000 | 2,500 | 0.58 | 2.55 | 1.14 | 1.41 | 124 |

These results clearly demonstrate the synergistic effect in suppressing the dissolution of calcium sulfate obtained by the indicated combinations of the sodium salt of amino tri (methylphosphonic) acid and sodium hydroxide, not only by the suppression or inhibition of calcium dissolution as hereinbefore described, but also by the suppression of sulfate dissolution.

While several particular embodiments of this invention are shown above, it will be understood, of course, that the invention is not to be limited thereto, since many modifications may be made, and it is contemplated, therefore, by the appended claims, to cover such modifications as fall within the true spirit and scope of this invention.

I claim:

1. In a process for the preparation of a sodium chloride brine having a reduced calcium sulfate content from crude sodium chloride salt containing calcium sulfate as an impurity by contacting the crude sodium chloride with dissolving water, the improvement comprising mixing with a member selected from the group consisting of the crude salt containing calcium sulfate as an impurity to be dissolved, the water used to dissolve said salt, and both water and said crude salt prior to dissolution of the sodium chloride a synergistic combination of (a) from one to about 500 parts per million by weight on a water basis of an organic phosphono compound selected from the group consisting of amino tri (methylphosphonic) acid, amino monoacetic di (methylphosphonic) acid, amino diacetic (monomethylphosphonic) acid, and the sodium and potassium salts thereof, and (b) from 25 to 6000 parts per million by weight on a water basis of an alkaline compound selected from the group consisting of the hydroxides and carbonates of sodium or potassium, thereafter continuously adding said synergistic combination to the water in contact with the crude salt, and maintaining the water containing said combination in contact with the crude salt for a period of time sufficient to dissolve the salt and form a substantially saturated brine.

2. The process of claim 1, wherein the concentration of the organic phosphono compound on a water basis is from about 5 to about 50 parts per million by weight.

3. The process of claim 1, wherein the concentration of the alkaline compound on a water basis is from about 50 to about 500 parts per million by weight.

4. In a process for preparing solid sodium chloride salt having a reduced calcium sulfate content from brine prepared by contacting with each other the substances water and sodium chloride containing calcium sulfate as an impurity, the improvement which comprises premixing with at least one of said substances on a water basis prior to contacting said water with said sodium chloride containing calcium sulfate:

(a) from 1 to about 500 parts per million of an organic phosphono compound selected from the group consisting of amino tri (methylphosphonic) acid, amino monoacetic di (methylphosphonic) acid, amino diacetic (monomethylphosphonic) acid, and the sodium and potassium salts thereof, and (b) from 25 to about 6000 parts per million of an alkaline compound selected from the group consisting of the hydroxides and carbonates of sodium and potassium, recovering the resultant brine and evaporating water therefrom to recover a solid sodium chloride salt having a reduced calcium sulfate content.

5. A process according to claim 4, wherein the alkaline compound is present in an amount of from 25 to 6000 parts per million and the organic phosphono compound is present in an amount of from 5 to 500 parts per million.

6. A process according to claim 4, wherein the alkaline compound is present in an amount of from 50 to 500 parts per million and the organic phosphono compound is present in an amount of from 5 to 50 parts per million.

References Cited
UNITED STATES PATENTS

| | | | |
|---|---|---|---|
| 2,906,600 | 9/1959 | Roland | 23—42 |
| 2,964,467 | 12/1960 | Lambert | 210—58 |
| 2,977,189 | 3/1961 | Landenberg | 23—89 |
| 3,140,915 | 7/1964 | Axelrod | 23—312 |
| 3,205,013 | 9/1965 | Miller | 23—42 |
| 3,234,124 | 2/1966 | Irani | 260—500 |
| 3,241,929 | 3/1966 | Jordan | 23—312 |
| 3,288,846 | 11/1966 | Irani | 260—500 |

NORMAN YUDKOFF, *Primary Examiner.*

S. EMERY, *Assistant Examiner.*